United States Patent
Nalur

[11] Patent Number: 6,071,546
[45] Date of Patent: Jun. 6, 2000

[54] COATED ICE CONFECTION

[75] Inventor: Shantha Chandrasekaran Nalur, Dublin, Ohio

[73] Assignee: Nestec S.A., Vevey, Switzerland

[21] Appl. No.: 09/192,407

[22] Filed: Nov. 16, 1998

[51] Int. Cl.[7] .................................................. A23G 9/00
[52] U.S. Cl. ....................... 426/100; 426/101; 426/274; 426/303; 426/306; 426/565
[58] Field of Search ..................... 426/565, 100, 426/101, 303, 272, 273, 274, 306

[56] References Cited

U.S. PATENT DOCUMENTS

| | | | |
|---|---|---|---|
| Re. 30,722 | 8/1981 | Olds et al. | 426/101 |
| 1,404,539 | 1/1922 | Nelson | 426/101 |
| 1,638,548 | 8/1927 | Nelson | 426/101 |
| 1,718,997 | 7/1929 | Burt | 426/101 |
| 1,901,394 | 3/1933 | Hassell | 426/101 |
| 2,191,352 | 2/1940 | Oprean | 426/101 |
| 2,282,801 | 5/1904 | Musher | 426/102 |
| 2,360,559 | 10/1944 | Glazer | 426/101 |
| 2,470,281 | 5/1949 | Allingham | 426/310 |
| 2,495,403 | 1/1950 | Bernards et al. | 426/303 |
| 2,524,291 | 10/1950 | Hoffman | 426/101 |
| 2,801,922 | 8/1957 | Oprean | 426/101 |
| 3,223,532 | 12/1965 | Pinkalla et al. | 426/101 |
| 3,232,765 | 2/1966 | Rosenthal et al. | 426/660 |
| 3,332,784 | 7/1967 | Ellis | 426/303 |
| 3,451,826 | 6/1969 | Mulder | 426/310 |
| 3,574,639 | 4/1971 | Forkner | 426/303 |
| 3,752,678 | 8/1973 | Jenkinson et al. | 426/101 |
| 3,773,519 | 11/1973 | Pisecky et al. | 426/99 |
| 3,895,105 | 7/1975 | Colten et al. | 426/306 |
| 3,928,649 | 12/1975 | Cobb | 426/565 |
| 4,387,109 | 6/1983 | Kahn et al. | 426/301 |
| 4,396,633 | 8/1983 | Tresser | 426/301 |
| 4,545,997 | 10/1985 | Wong et al. | 426/94 |
| 4,643,894 | 2/1987 | Porter et al. | 424/35 |
| 4,738,865 | 4/1988 | Morris | 426/658 |
| 4,762,721 | 8/1988 | Holscher et al. | 426/94 |
| 4,906,412 | 3/1990 | Zielinski et al. | 266/398.2 |
| 4,985,263 | 1/1991 | Klug et al. | 426/303 |
| 5,017,390 | 5/1991 | Sawant | 426/101 |
| 5,019,403 | 5/1991 | Korchta | 426/100 |
| 5,085,877 | 2/1992 | Youcheff et al. | 426/306 |
| 5,149,560 | 9/1992 | Kealey et al. | 426/306 |
| 5,273,763 | 12/1993 | Merz et al. | 426/101 |
| 5,500,233 | 3/1996 | Youcheff et al. | 426/306 |
| 5,518,740 | 5/1996 | Costanzo et al. | 426/302 |
| 5,556,659 | 9/1996 | DePedro et al. | 426/101 |

FOREIGN PATENT DOCUMENTS

| | | |
|---|---|---|
| 59-59149 | 4/1984 | Japan . |
| 60-118147 | 6/1985 | Japan . |
| 61-56045 | 3/1986 | Japan . |
| 91/01649 | 2/1991 | WIPO . |
| 95/21536 | 8/1995 | WIPO . |

OTHER PUBLICATIONS

*Hawley's Condensed Chemical Dictionary*, pp. 461, 555, 1993.

*Primary Examiner*—Cynthia L. Nessler
*Attorney, Agent, or Firm*—Pennie & Edmonds LLP

[57] ABSTRACT

An ice confection comprising an ice confection core, a fat-based outer coating layer and an edible emulsifier as a precoating layer between the ice confection core and the edible fat-based outer coating layer, wherein the edible emulsifier includes both hydrophilic and lipophilic moieties.

19 Claims, No Drawings

COATED ICE CONFECTION

FIELD OF THE INVENTION

The present invention relates to a coated ice confection and to the production thereof, and more particularly to an ice confection coated with an edible fat-based, non-gelatinous compound.

BACKGROUND OF THE INVENTION

Cracking and non-adherence of the coating of ice cream bars during consumption is one of the major causes of complaints from consumers. It is not only messy but also it prevents the consumer from eating the entire coated product. An examination of store purchased coated ice creams showed that in numerous instances cracking had occurred and a significant percentage of the coating had fallen off. The cracking of the coating could be due to several reasons, such as ice cream shrinkage, temperature abuse or the composition of the ice cream and the coating, and may also be due to poor adhesion of the coating to the ice cream.

One method for solving this problem is disclosed in U.S. Pat. No. 2,191,352 to Oprean. The '352 reference discloses a confection comprising a frozen core or center surrounded by a coating of an edible gelatinous substance which substantially prevents cracking or flaking of the coating from the core when the product is consumed. If desired, the gelatinous coating material may be blended with flavoring materials such as chocolate liquor. However, as recognized in a later patent to the same inventor, i.e., U.S. Pat. No. 2,801,922 (see col. 1, lines 56–71), in products produced with the coating of the '352 patent, the components never blend together and the core and coating cannot be eaten as one. Thus, "[t]he product of said patent is a 'somewhat chewy and cold-eating piece'" (see col. 1, lines 70–71 of the '922 patent).

The Oprean '922 patent attempts to remedy the deficiencies noted in the earlier '352 patent by providing a cushioning edible sheath around the frozen core. This sheath is composed of an emulsion of a gelatinous substance in an edible solvent having decomposed therein "large quantities of discrete, relatively insoluble gaseous air particles" which form gelatinous bubbles and suction-like cups to mechanically bind to an inner face of an outer chocolate coating layer. As the air cannot be solidified or completely frozen within the gelatinous matrix, however, the coating material is a very soft, sticky mushy material in its semi-liquid and set form (see, e.g., col. 5, lines 71–72). Moreover, the amount and disposition of the entrapped air must be carefully monitored and controlled during production which adds significantly to the cost and complexity of the manufacturing process.

U.S. Pat. No. 1,638,548 discloses, on p. 3 at col. 1 (lines 60–62), the formation of a frozen ice confection with two coating layers, e.g., a first gelatinous coating layer followed by an outer oleaginous coating of, for example, chocolate. However, as noted for instance in the Oprean '922 patent discussed above, the interposition of such a gelatinous coating layer between the frozen core and an outer chocolate coating produces a "somewhat chewy and cold-eating piece".

Subsequent methods for improving the adhesion of fat-based coatings to ice confections using a precoating or interface layer between the ice confection and the edible fat-based coating includes, for example, WO91/01649 which discloses a method for enhancing the adherence of coatings to frozen fat-based confections such as ice cream by applying a composition to the surface of a frozen fat-based confection as an interface layer between the frozen fat-based confection and the coating, wherein the interface layer composition comprises an effective amount of an edible polysaccharide, e.g., maltodextrin, in an aqueous solution, to enhance the adherence of the coating to the confection. WO95/21536 discloses an ice confection having a coverture layer on at least part of its surface, the layer including a first, inner, precoating layer. The precoating layer may have a similar or a different composition to the outer coverture layer and contains from about 25% to about 100% fat.

SUMMARY OF THE INVENTION

It has now been discovered, surprisingly, that excellent adhesion between the ice confection and the edible fat-based coating can be achieved at relatively low cost by precoating the ice confection with an edible emulsifier containing both hydrophilic and lipophilic moieties.

Accordingly, the invention relates, in a first embodiment, to an ice confection formed of an ice confection core, an edible, fat-based outer coating layer and a precoating layer comprised of an edible emulsifier. The precoating layer is positioned between the ice confection core and the edible, fat-based outer coating layer and has both hydrophilic and lipophilic moieties. The edible emulsifier has a hydrophilic-lipophilic balance ("HLB") of from about 1 to about 16, and in an alternate embodiment, from about 3 to about 8. In a preferred embodiment, the ice confection which forms the core is ice cream.

The edible, fat-based outer coating layer may be based on a vegetable fat. In a preferred embodiment it may be chosen from among dark, milk or white chocolate or it may instead be produced as a compound coating containing vegetable fats or direct cocoa butter replacements, stearines, coconut oil, palm oil, butter, and mixtures thereof.

The edible emulsifier may be a natural or a synthetic emulsifier. It should be present in an amount sufficient to enhance adhesion between the ice confection core and the outer coating layer, e.g., preferably from about 0.01 to about 1.0% by weight based upon the total weight of the ice confection. Preferred edible emulsifiers include, but are not limited to, hydroxylated lecithin and sodium stearoyl-2-lactylate.

In an alternate embodiment the invention relates to a method for improving the adhesion of a fat-based coating to an ice confection which comprises applying an edible emulsifier having hydrophilic and lipophilic moieties to the ice confection in an amount sufficient to form an adhesion-enhancing precoating layer upon the ice confection and then applying the fat-based coating upon at least a portion of the precoating layer to form a coated ice confection having improved adhesion to the coating. In a preferred embodiment, an edible emulsifier is chosen which has an HLB value of between about 1 and about 16, although in an alternate embodiment the HLB value ranges from about 3 to about 8.

In one embodiment of the method of the invention edible emulsifier is applied in an aqueous medium at a concentration of from about 0.1 to about 5.0 percent by weight. The precoating may be applied by, e.g., dipping, spraying, enrobing or any other method routinely practiced in this art.

The fat based outer coating is typically applied to the precoating layer within a period of from about 1 to about 60 minutes after application of the precoating at a temperature of from about 10 to about 35° C. Preferred edible emulsifiers for use in the method include, but are not limited to, hydroxylated lecithin and sodium stearoyl-2-lactylate. The method may additionally include, if desired, adding a flavor and/or a color to the edible emulsifier prior to its application upon the ice confection core.

In a still further embodiment, the invention is directed to an ice confection having an improved adhesion fat-based coating thereon, produced according to the method of the invention as described above.

DETAILED DESCRIPTION OF THE INVENTION

The ice confection may be milk- or fat-based and may be, for instance, yogurt, ice milk or a frozen dessert. However, the invention is particularly suitable when the ice confection is ice cream. The edible fat-based outer coating layer may be based on vegetable fat and may include any kind of coating with fat as the continuous phase, for example, dark, milk or white chocolate or compound coatings containing vegetable fats or various substitutes such as direct cocoa butter replacements, stearines, coconut oil, palm oil, butter or any mixture thereof.

A wide variety of edible emulsifiers have been determined to be useful in the present invention. In particular, to ensure proper adhesion between the frozen ice confection core and the outer edible fat-based coating, an edible emulsifier for use with the invention must possess both hydrophilic and lipophilic moieties, thus excluding gelatin or gelatin based compounds which lack such lipophilic moieties. The presence of hydrophilic and lipophilic moieties within the HLB range discussed below ensures solubility of the emulsifier in both fats and oils and is thus important in providing the necessary degree of bonding between the frozen ice confection core and the outer edible fat-based coatin. It eliminates the need to provide a mechanical bond between the two layers, such as that provided by the gelatinous suction cups disclosed in the Oprean U.S. Pat. No. 2,801,922 discussed above.

The emulsifiers preferred for use in the invention have a hydrophilic/lipophilic balance ("HLB") value of between about 1 and about 16, most preferably about 2 to about 11 and more preferably about 3 to about 8. HLB values, which are well known and understood by those working in this field, indicate, roughly speaking, the percentage weight of the hydrophilic portion of the emulsifier molecule. Thus, for example, an emulsifier which is 80% hydrophilic has an HLB value of 80. In reporting HLB values, however, it is conventional to multiply these values by 1/5 (i.e., 20%) for convenience in handling smaller numbers. This practice will therefore be utilized herein. Thus, an emulsifier which is 80% hydrophilic would be reported as having an HLB value of 16. The lower the HLB value, the more lipid-soluble the material is.

Emulsifiers which are preferred for use in forming the edible emulsifier coating layer of the invention include, but are not limited to, natural emulsifiers such as lecithin (HLB about 1 to about 9, depending upon the percentage of lecithin in the emulsifier), and synthetic emulsifiers. Preferred synthetic emulsifiers include hydroxylated lecithins having an HLB ranging from about 10–11; a stearoyl lactylate such as sodium stearoyl-2-lactylate (HLB=about 4.5–16 depending upon concentration); a mono or di-glyceride of an edible fatty acid (HLB=about 1 to about 4) or an ester of such a mono or di-glyceride with, e.g., citric, diacetyl-tartaric, acetic, lactic or teartaric acid (HLB=about 3 to about 13); a polyglyceric ester of an edible fatty acid (HLB=about 4 to about 10); an ester of an edible fatty acid of propylene glycol (HLB=about 1 to about 6); a sucroester of a sucroglyceride (HLB=about 1 to about 7); and ammonium phosphatide (HLB=about 2–3).

The amount of emulsifier may be from 0.01 to 1.0% and preferably from 0.025 to 0.05% by weight based on the total weight of the ice confection. The edible emulsifier is advantageously used in an aqueous medium in which some emulsifiers form an emulsion and other emulsifiers form a colloidal suspension. The concentration of the edible emulsifier in the aqueous medium may be from 0.1 to 5%, preferably from 0.2 to 2.5% and especially from 0.25 to 1.5% by weight. Although the edible emulsifier should be capable of forming a precoating layer which is undetectable when eating, i.e., it is white or colorless and tasteless, a flavor or color may be added to the edible emulsifier, if desired.

The present invention also provides a method for improving the adhesion of a fat-based coating to an ice confection which comprises applying an edible emulsifier as defined above to the surface of the ice confection to form a precoating layer and then applying the fat-based coating to the precoating layer.

The precoating may conveniently be applied to the ice confection by dipping, spraying, or enrobing. The fat-based coating may be applied to the precoating layer in a similar manner, usually within a period of from about 1 to 60 minutes and preferably from about 5 to 30 minutes after the application of the precoating. The fat-based coating should be flowable and coatable at the temperature at which it is applied which may be from about 100 to 35° C. and more usually from about 150 to 30° C. If the temperature is too low, the coating may not flow and if the temperature is too high, e.g. 40° C., the coating may dissolve the emulsifier precoating and tend to slip off the ice cream without coating it properly. Typically, the plastic viscosity of the fat-based coating is from about 2 to 4 poise although in some cases it may be higher, and the yield value is preferably from about 4 to 7 dynes/cm$^2$.

The edible emulsifier is advantageously applied in an aqueous medium, usually in the form of an emulsion or a colloidal suspension depending on the nature of the emulsifier, at a concentration from about 0.1 to 5%, preferably from about 0.2 to 2.5% and especially from about 0.25 to 1.5% by weight.

EXAMPLES

The following Examples further illustrate the present invention but should not be construed as limiting the invention in any manner.

Examples 1 to 3

Extruded ice cream centers (80% overrun) supported on a stick are made and maintained at −20° C. to −30° C. The bars weigh between 42–44 g each. These bars are dipped into an aqueous 30 emulsion (Example 1) or a colloidal suspension (Examples 2–3) of the Precoat at 4° C. and immediately cooled to and maintained at −20° C. to −30° C. The emulsifiers used for the Precoat and their concentrations are shown in Table 1.

TABLE 1

| EXAMPLE | PRECOAT | TRADE NAME | % IN WATER |
|---|---|---|---|
| 1 | Hydroxylated lecithin | Yelkin 1018 | 1.0% |
| 2 | Sodium stearoyl-2-lactylate | Paniplex | 0.5% |
| 3 | Sodium stearoyl-2-lactylate | Paniplex | 1.0% |

After 20 minutes, these bars (at −20° C. to −30° C.) are dipped into a coating having the composition shown in Table 2 maintained at 20° C. The plastic viscosity is 3 poise and the yield value is 5 dynes/cm$^2$.

TABLE 2

| INGREDIENT | PERCENTAGE |
|---|---|
| COCOA LIQUOR | 10.9 |
| SUGAR | 31.0 |
| SWEET WHEY | 9.8 |
| COCONUT OIL (M.P. 24.5° C.) | 32 |
| VANILLIN | 0.03 |
| ANHYDROUS BUTTER FAT | 4.0 |
| PARTIALLY HYDROGENATED SOYA OIL | 11.77 |
| LECITHIN | 0.5 |

The following tests were used to evaluate the cracking of the coating:

1. Adherence Test: The coating was manually peeled from the ice cream center and visually observed to see if any ice cream was sticking to it.
2. Instron Test to assess cracking: The cracking test was performed with Instron Model 1122 equipped with a temperature controlled cabinet. A blade (0.075 inch thickness) having a tapered edge was used to impact the bars. The temperature of the cabinet was maintained at −4° C. using liquid carbon dioxide. The blade speed was varied from 1 inch/min. to 10 inch/min. and the distance of travel through the bar was 10 mm. The extent of cracking was observed visually.

The adherence of the coating was significantly superior to and the degree of cracking was significantly less than those of a control coated ice cream bar without a precoat.

Examples 4 to 9

Molded ice cream centers were treated as in Examples 1 to 3 except that they were dipped into the precoats shown in Examples 4 to 9 of Table 3 at a concentration in water of 1%. In Comparative Examples A and B of Table 3 controls were made with single and double coatings having the composition of Table 2 but without a precoat.

Evaluation of Cracking was carried out using a Texture Analyzer: A TA.XT2 analyzer equipped with XTRAD software was used to count the number of cracks of the ice cream coating. A TA-47 blade was used at a speed of 0.5 mm/sec to a distance of 5 mm with a trigger force of 10 grams and a post test speed of 10 mm/sec. A single test was performed per ice cream bar and 3 tests were run for each treatment. A force threshold of 30 g was selected and the number of peaks (representing cracking) were counted.

The cracking of the ice cream coatings as measured by Texture 30 Analyzer TA.XT2 is shown in Table 3.

TABLE 3

| Example | Treatments (precoats at 1% concentration) | No. of Peaks[1] obtained using TA.XT2* |
|---|---|---|
| A | Control, single coating (no precoat) | 12 |
| B | Double coating (no precoat) | 10 |
| 4 | Lecithin precoat | 8 |
| 5 | Hydroxylated lecithin precoat | 6.3 |
| 6 | Sodium Stearoyl -2- lactylate precoat | 5.3 |
| 7 | Mono, and Di- glyceride precoat | 7 |
| 8 | Sorbitan Tristearate precoat | 8 |
| 9 | Ammonium Phosphatide precoat | 8.3 |

*Average of 3 determinations.
[1]The number of peaks represents the number of cracks on the ice cream coating.

What is claimed is:

1. An ice confection comprising an ice confection core, an edible fat-based outer coating layer and a precoating layer consisting essentially of an edible emulsifier located between the ice confection core and the edible fat-based outer coating layer, said edible emulsifier having both hydrophilic and lipophilic moieties.

2. The ice confection according to claim 1 wherein the edible emulsifier has an HLB value of from about 3 to about 8.

3. An ice confection according to claim 1 wherein the ice confection is ice cream.

4. An ice confection according to claim 1 wherein the edible, fat-based outer coating layer is based on vegetable fat.

5. An ice confection according to claim 1 wherein the edible, fat-based outer coating layer is formed from a material selected from among dark, milk and white chocolate and compound coatings containing vegetable fats and direct cocoa butter replacements, stearines, coconut oil, palm oil, butter and mixtures thereof.

6. An ice confection according to claim 1 wherein the edible emulsifier is a natural or a synthetic emulsifier and is present in an amount sufficient to enhance adhesion between the ice confection core and the outer coating layer.

7. An ice confection according to claim 1 wherein the edible emulsifier is present in an amount of from about 0.01 to about 1.0% by weight based upon the total weight of the ice confection.

8. An ice confection comprising an ice cream core, an edible, fat-based outer coating layer and a precoating layer consisting essentially of an edible emulsifier between the ice cream core and the edible, fat-based outer coating layer, said edible emulsifier having both hydrophilic and lipophilic moieties and also having an HLB value of from about 1 to about 16.

9. An ice confection according to claim 1 wherein the edible emulsifier is hydroxylated lecithin or sodium stearoyl-2-lactylate.

10. A method for improving the adhesion of a fat-based coating to an ice confection which comprises applying an edible emulsifier having hydrophilic and lipophilic moieties to the ice confection in an amount sufficient to form an adhesion-enhancing precoating layer thereupon and then applying the fat-based coating upon at least a portion of the precoating layer to from a coated ice confection having improved adhesion of the coating thereon.

11. A method according to claim 10 which further comprises choosing an edible emulsifier having an HLB value of between about 1 and about 16.

12. A method according to claim 10 wherein the edible emulsifier is applied in an aqueous medium at a concentration of from about 0.1 to about 5 percent by weight.

13. A method according to claim 10 wherein the precoating is applied to the ice confection by dipping, spraying or enrobing.

14. A method according to claim 10 wherein the fat-based coating is applied to the precoating layer within a period of from about 1 to about 60 minutes after application of the precoating.

15. A method according to claim 10 wherein the fat-based coating is applied at a temperature of from about 10 to about 35° C.

16. A method according to claim 10 wherein the edible emulsifier is selected from the group consisting of hydroxylated lecithin and sodium stearoyl-2-lactylate.

17. A method according to claim 10 which further comprises adding a flavor and/or a color to said edible emulsifier prior to its application.

18. A method for improving the adhesion of a fat-based coating to an ice cream core of an ice confection, said method comprising applying an edible emulsifier having hydrophilic and lipophilic moieties to said ice cream core in an amount sufficient to form an adhesion-enhancing precoating layer upon said core, and then applying the fat-based coating upon at least a portion of the precoating layer to form a coated ice cream confection having improved adhesion of the coating thereon, wherein said edible emulsifier has an HLB value if from about 1 to about 16.

19. An ice confection having an improved adhesion fat-based coating thereon produced according to the method of claim 10.

* * * * *